US012327363B2

(12) United States Patent
Ray et al.

(10) Patent No.: US 12,327,363 B2
(45) Date of Patent: Jun. 10, 2025

(54) APPARATUS, METHOD AND SYSTEM FOR GENERATING MODELS FOR IDENTIFYING OBJECTS OF INTEREST FROM IMAGES

(71) Applicant: HITACHI HIGH-TECH CORPORATION, Tokyo (JP)

(72) Inventors: Anirban Ray, Tokyo (JP); Hideharu Hattori, Tokyo (JP); Yasuki Kakishita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 158 days.

(21) Appl. No.: 18/018,779

(22) PCT Filed: Feb. 2, 2021

(86) PCT No.: PCT/JP2021/003754
§ 371 (c)(1),
(2) Date: Jan. 30, 2023

(87) PCT Pub. No.: WO2022/030034
PCT Pub. Date: Feb. 10, 2022

(65) Prior Publication Data
US 2024/0265551 A1    Aug. 8, 2024

(30) Foreign Application Priority Data
Aug. 4, 2020    (JP) .................................. 2020-132371

(51) Int. Cl.
*G06T 7/194*    (2017.01)
*G06V 10/25*    (2022.01)
(Continued)

(52) U.S. Cl.
CPC .............. *G06T 7/194* (2017.01); *G06V 10/25* (2022.01); *G06V 10/44* (2022.01); *G06V 10/764* (2022.01);
(Continued)

(58) Field of Classification Search
CPC .......... G06T 7/194; G06T 2207/20081; G06V 10/25; G06V 10/44; G06V 10/764;
(Continued)

(56) References Cited

U.S. PATENT DOCUMENTS 9,224,071 B2    12/2015   Tu et al.
10,692,220 B2*  6/2020   Gao ....................... G06T 7/194
(Continued)

FOREIGN PATENT DOCUMENTS

WO    2020/031423 A1    2/2020

OTHER PUBLICATIONS

International Search Report and English Translation, PCT/JP2021/003754, dated Apr. 6, 2021 (4 pgs.).

*Primary Examiner* — Aaron W Carter
(74) *Attorney, Agent, or Firm* — Volpe Koenig

(57) ABSTRACT

An apparatus for generating models for identifying objects of interest from images is disclosed. The apparatus includes an input unit that receives input images, an object segmentation unit that receives the input images from the input unit and separates regions of objects of interest from a background region, and a learning unit that learns models used by the object segmentation unit. The learning unit trains new models using training data and outputs of existing models in relation to the training data, adds the trained new models to the existing model, and repeats the training of the new models and the adding of the trained new models to the existing models.

7 Claims, 15 Drawing Sheets

(51) Int. Cl.
  *G06V 10/44* (2022.01)
  *G06V 10/764* (2022.01)
  *G06V 20/70* (2022.01)
(52) U.S. Cl.
  CPC .... *G06V 20/70* (2022.01); *G06T 2207/20081* (2013.01)
(58) Field of Classification Search
  CPC ...... G06V 20/70; G06V 10/26; G06V 10/774; G06V 10/778; G06N 3/08; G06N 20/00
  See application file for complete search history.

(56) References Cited

U.S. PATENT DOCUMENTS

| | | | |
|---|---|---|---|
| 11,546,568 B1* | 1/2023 | Yoon | H04N 13/128 |
| 2007/0122039 A1* | 5/2007 | Zhang | G06T 7/149 |
| | | | 382/199 |
| 2008/0304743 A1* | 12/2008 | Tang | G06V 10/28 |
| | | | 382/173 |
| 2012/0314942 A1* | 12/2012 | Williams | G06T 7/194 |
| | | | 382/199 |
| 2015/0003725 A1* | 1/2015 | Wan | G06T 7/11 |
| | | | 382/154 |
| 2015/0278616 A1* | 10/2015 | Li | G06V 10/764 |
| | | | 382/103 |
| 2015/0334398 A1* | 11/2015 | Socek | H04N 19/182 |
| | | | 375/240.26 |
| 2019/0012790 A1* | 1/2019 | Aoba | G06V 10/764 |
| 2020/0372660 A1* | 11/2020 | Li | G06V 10/764 |
| 2021/0302155 A1* | 9/2021 | Matsuda | G01B 15/04 |
| 2022/0327813 A1* | 10/2022 | Shibata | G06V 10/7753 |
| 2022/0366242 A1* | 11/2022 | Tsunoda | G06V 10/7715 |
| 2023/0130281 A1* | 4/2023 | Brown | G06N 3/04 |
| | | | 345/420 |
| 2023/0177699 A1* | 6/2023 | Ray | G06T 7/194 |
| | | | 382/173 |
| 2024/0265551 A1* | 8/2024 | Ray | G06N 3/08 |
| 2024/0311533 A1* | 9/2024 | Agrawal | G06F 30/27 |

* cited by examiner

APPARATUS, METHOD AND SYSTEM FOR GENERATING MODELS FOR IDENTIFYING OBJECTS OF INTEREST FROM IMAGES

INCORPORATION BY REFERENCE

The present application claims the benefit of Japanese Patent Application No. 2020-132371 filed on Aug. 4, 2020, which is incorporated herein in its entirety by reference.

TECHNICAL FIELD

The present invention relates to identification of objects of interest in images.

BACKGROUND ART

In recent years, proposals have been made for detection of unknown objects in images or other visual media. For example, PTL 1 discloses a technique for finding a new objects by clustering different object types in images based on a saliency score and a plurality of statistical models.

CITATION LIST

Patent Literature

PTL 1: U.S. Pat. No. 9,224,071 B2

SUMMARY OF INVENTION

Technical Problem

A key element of a quantitative analysis of objects in images is to accurately identify necessary objects of interest. The objects in the image may be already known objects of interest, may be unknown objects of interest, or may be objects other than the objects of interest. For example, images may include many unnecessary objects that are visually similar to necessary objects, along with a background area that occupies a large portion. In order to obtain the necessary portion in the images for the quantitative analysis, it is necessary to separate necessary foregrounds from the images and classify it for a detailed quantitative analysis. However, in PTL 1, unknown objects of interest can be found but cannot be classified. Identifying the type of objects of interest is important for the detailed quantitative analysis.

Solution to Problem

One preferred mode of the present invention is an apparatus for generating a model for identifying objects of interest from images including an input unit that receives input images; objects segmentation unit that receives the input images from the input unit and separates regions of objects of interest from a background region; and a learning unit that learns models to be used by the object segmentation unit. The learning unit trains a new model using training data and an output of existing models in relation to the training data, adds the new model that has been trained to the existing models, and repeats the training of the new model and the adding of the new model that has been trained to the existing models.

Advantageous Effects of Invention

One mode of the present invention can generate a model that identifies objects of interest from images.

DESCRIPTION OF EMBODIMENTS

Figure 1:
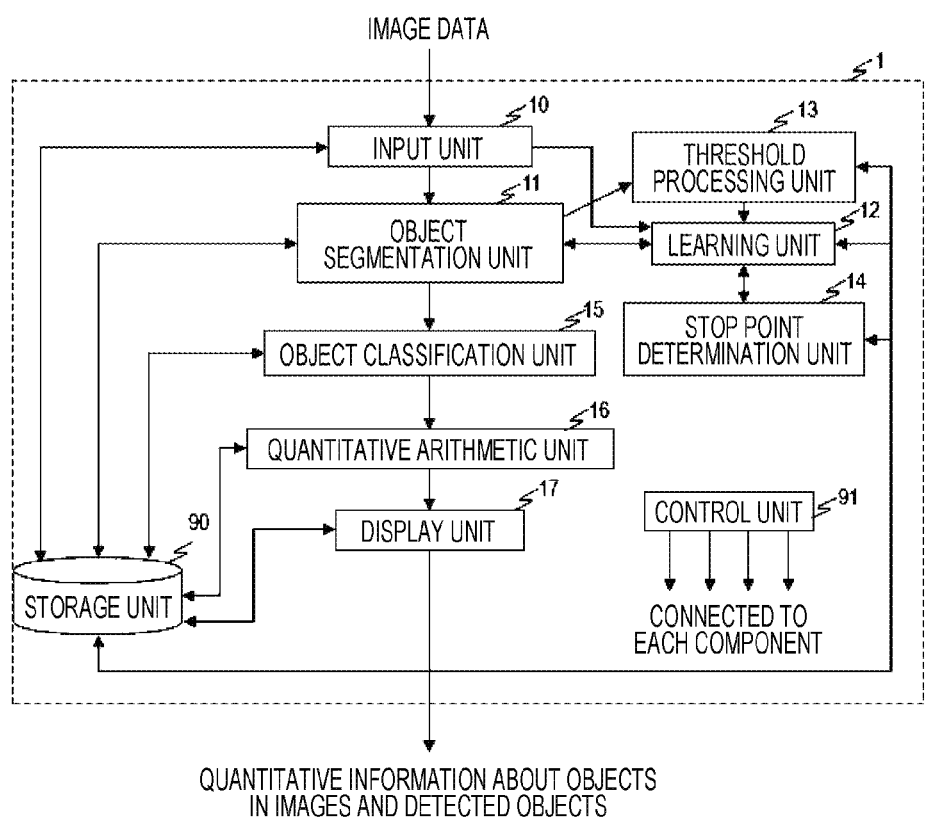
FIG. 1 is a block diagram illustrating a functional configuration of a quantitative analysis apparatus for objects of interest in images according to a first embodiment.

Hereinafter, embodiments of the present invention will be described in detail with reference to the drawings. For convenience, when necessary, the description will be divided into a plurality of sections or embodiments, but unless otherwise specified, they are not unrelated to each other, and one is related to a part or all modifications, details, supplementary explanation, and the like of the other. Further, in the following, when referring to the number of elements and the like (including number, numerical value, amount, range, etc.), the number of elements is not limited to a specific number unless otherwise stated or unless clearly limited to the specific number in principle, and the number of elements may be greater or less than or equal to the specific number.

This apparatus and this system may be a physical computer system (one or more physical computers), or may be an apparatus and a system constructed on a calculation resource group (a plurality of calculation resources) such as a cloud infrastructure. The computer system or the calculation resource group includes one or more interface devices (including, for example, a communication device and an input-output device), one or more storages (including, for example, a memory (main storage) and an auxiliary storage), and one or more arithmetic devices.

In a case where a function is achieved by the arithmetic device executing programs including a command code, determined processing is appropriately performed by using the storage and/or an interface device, and thus, the function may be at least a part of the arithmetic device. The processing described with the function being the subject may be processing performed by the arithmetic device or a system having the arithmetic device. The program may be installed from a program source. The program source may be, for example, a program distribution computer or a computer-readable storage medium (for example, a non-transitory storage medium readable by the computer). The description of function is an example, and a plurality of functions may be integrated into one function or one function may be divided into a plurality of functions.

[Outline]

The outline of the embodiments will be described first. It is assumed that images targeted in the present invention is constituted by objects of interest, and a user needs to inspect the objects of interest in the images or a characteristic of entire images or a partial image related to the objects of interest. However, not all objects in the images are necessarily known. In addition, the images does not necessary include only required objects, and may include objects of disinterest or objects unnecessary for inspection. Note that unknown or known objects described in this specification may have any shape, color, or texture attribute. The objects described in this specification may lack any natural color and may not be observable by a naked eye.

The detection of known objects can be easily performed by a person. However, in a case where many objects of interest are present and the characteristics of the objects are unknown, automatic processing is required for processing a few thousand to millions of images in a short time. Therefore, in order to automate this processing, it is necessary to detect necessary objects in images and discard unnecessary objects and unnecessary portion in the images. From this viewpoint, an embodiment in this specification described below enables detection of necessary foreground objects and discarding of unnecessary objects of disinterest.

A learning unit helps an object segmentation unit learn new unknown object groups. A threshold processing unit helps the learning unit discard unnecessary objects from learning data. A stop point determination unit determines the number of steps (the number of iterations) necessary for the learning unit to learn new unknown objects. An object classification unit classifies objects of interest into respective class categories of known objects and respective groups of unknown objects. Thereafter, a quantitative calculation unit performs an accurate quantitative analysis of objects, and finally, the display unit presents necessary quantitative information to the user.

An input unit is a functional unit that receives input images in the quantitative analysis apparatus. The input images are sent to the object segmentation unit and is subjected to further processing in the quantitative analysis apparatus. The images including objects of interest and unnecessary objects is first sent to the object segmentation unit.

The object segmentation unit is a functional unit that can distinguish necessary objects from unnecessary objects based on a preset rule. The segmentation rule is obtained from the learning unit. The learning unit learns to separate (segment) objects as the foreground from another objects as the background. The threshold processing unit helps the learning unit discard unnecessary objects of disinterest detected as the background. The learning unit repeatedly uses data a plurality of times to learn segmentation.

The stop point determination unit determines the optimum number of steps required by the learning unit. The rule in segmentation can be coded in the object segmentation unit. For example, the object segmentation unit can have any configuration to identify necessary objects in foreground. The object segmentation unit can be configured by, for example, a neural network, and is trained (learned) using a pair of images and labels in a case where the labels is available, and using labels generated by itself in a case where actual images and labels are not available. The object segmentation unit can thus detect the foreground objects accurately. Alternatively, the object segmentation unit can also use other methods for generating the foreground area.

First Embodiment

FIG. 1 is a block diagram illustrating a functional configuration of a quantitative analysis apparatus 1 for objects of interest in images according to a first embodiment. As illustrated in FIG. 1, the quantitative analysis apparatus 1 includes an input unit 10, an object segmentation unit 11, a threshold processing unit 13, a learning unit 12, a stop point determination unit 14, an object classification unit 15, a quantitative arithmetic unit 16, a display unit 17, a storage unit 90, and a control unit 91. Furthermore, each functional unit of the quantitative analysis apparatus 1 illustrated in FIG. 1 can be realized by various hardware, software, or a combination thereof, and can be realized by, for example, one or a plurality of information processing apparatuses such as a personal computer and a server.

The input unit 10 acquires input images to be processed by the quantitative analysis apparatus 1 from the outside. The data is obtained by any images capturing apparatus (not illustrated) and provided to the input unit 10 as input images. Furthermore, images captured by a camera obtained via an information communication network or a recording medium (not illustrated) can be used as the input images. The input images may be still images, or may be generated by extracting frames in a moving image. As the data format of the still images, for example, Joint Photographic Experts Group (JPEG), JPEG 2000, Portable Network Graphics (PNG), or Windows bitmap (BMP) can be used. Meanwhile, Motion JPEG, Moving Picture Experts Group (MPEG), H.246, high definition serial digital interface (HD-SDI), or the like can be used as the data format of the moving image.

The object segmentation unit 11 divides an image into foreground regions including objects and a background region to separate the necessary foreground regions from the unnecessary region.

The threshold processing unit 13 helps the learning unit 12 discard unnecessary objects of disinterest detected as the background. The image may include objects of interest, and the images may further include unnecessary objects. The threshold processing unit 13 prevents the learning unit 12 from learning unnecessary objects as foreground objects.

The learning unit 12 performs learning (training) of a new model for the object segmentation unit 11. The learning unit 12 learns the type of new unknown objects together with known objects, and the object segmentation unit 11 enables the objects of interest in the images to be separated from other objects. The learning unit 12 receives the input images and iteratively learns the unknown objects of interest in the images.

The stop point determination unit 14 determines the optimum number of iterations necessary for the learning unit 12 to learn unknown objects of interest in the images. The object classification unit 15 classifies the foreground regions of original images into known object groups and unknown object groups for a quantitative analysis based on the foreground regions separated by the object segmentation unit 11. The quantitative arithmetic unit 16 calculates necessary quantitative information on the objects identified as the foregrounds. The quantitative information may be various types of information, such as a number or a ratio (but not limited to them).

The storage unit 90 stores inputs, outputs, and intermediate results of each component in the quantitative analysis apparatus 1. The control unit 91 is connected to each of the above components of the quantitative analysis apparatus 1 and controls the operations of these components. In another example, each component may operate automatically as necessary without being controlled by the control unit 91.

[Hardware Configuration of Quantitative Analysis Apparatus]

Figure 2:
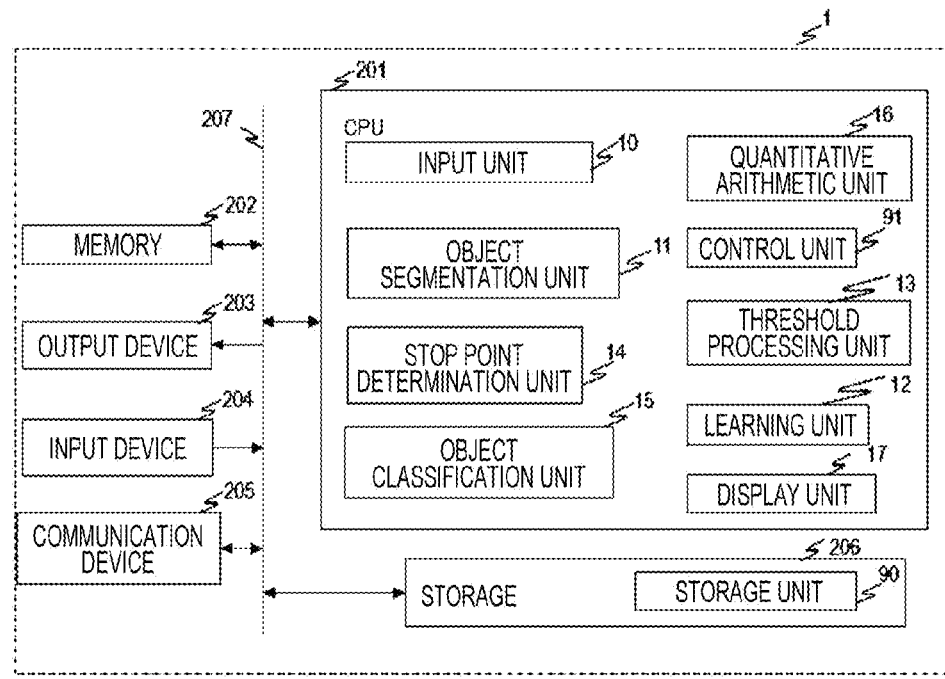
FIG. 2 is a schematic diagram illustrating an example of a hardware configuration of the quantitative analysis apparatus according to the first embodiment.

FIG. 2 is a schematic diagram illustrating an example of a hardware configuration of the quantitative analysis apparatus 1 according to the first embodiment. As illustrated in FIG. 2, the quantitative analysis apparatus 1 includes, as an example, a central processing unit (CPU) 201, a memory 202, a storage 206, an output device 203, an input device 204, a communication device 205, and a bus 207 that interconnects the components. The number of these components may be two or more.

The CPU 201, which is a processing unit, reads various programs from the memory 202 as necessary, and executes processing in accordance with the programs. As illustrated in FIG. 1, each of the functional components including the input unit 10, the object segmentation unit 11, the threshold processing unit 13, the learning unit 12, the stop point determination unit 14, the object classification unit 15, the quantitative arithmetic unit 16, the display unit 17, and the control unit 91 can be realized by, for example, the CPU 201 that executes processing.

The storage 206 stores various data to be used in the quantitative analysis apparatus 1, and the storage unit 90 described with reference to FIG. 1 can be mounted. For example, the storage 206 stores input images, objects, a learned model for each iteration of learning by the learning unit, and classification images for each class as described above.

The output device 203 outputs an object segmentation image (object separation image), classification object images, necessary quantitative information about objects, and the like, and includes a display device, a printer, a speaker, or the like. For example, in a case where the display device is used as the output device 203, the segmentation images generated by the object segmentation unit 11, the object images classified by the object classification unit 15, and the necessary quantitative information about the objects obtained by the quantitative arithmetic unit 16 are displayed on a screen of the display device.

The input device 204 is a device for a user to input an instruction and the like, and includes a keyboard, a mouse, a microphone, and the like. For example, input images to be processed in the quantitative analysis apparatus 1 are determined together with an instruction from the user via the input device 204.

The communication device 205 is a device for communicating with another device. For example, the communication device 205 can be used to receive input images transferred from the imaging apparatus, and can transmit and receive various data to and from a server connected via a network. In another example, instead of mounting the communication device 205 in the quantitative analysis apparatus 1, the communication device 205 that is externally mounted may be connected to the quantitative analysis apparatus 1.

[Configuration and Operation of Each Component]

Operations of the object segmentation unit 11, the learning unit 12, the threshold processing unit 13, the stop point determination unit 14, the object classification unit 15, the quantitative arithmetic unit 16, and the display unit 17 will be described in detail below.

Figure 3:
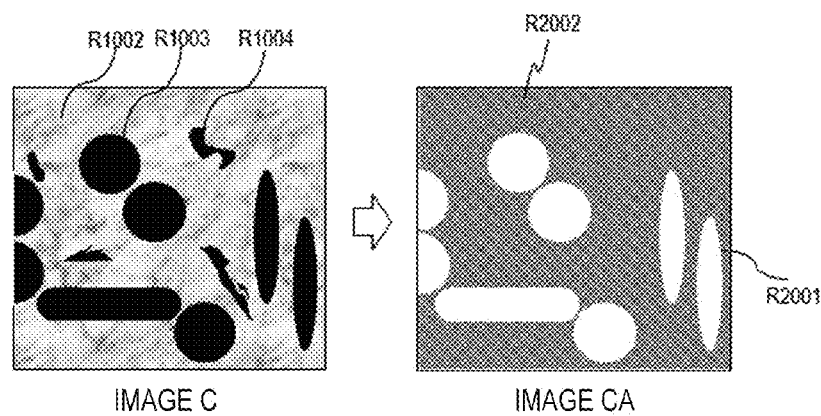
FIG. 3 schematically illustrates an example of processing to be executed by an object segmentation unit.

FIG. 3 schematically illustrates an example of processing to be executed by the object segmentation unit 11. In FIG. 3, an image C is an example of the input image, and includes an image background R1002, a foreground object R1003, and another unnecessary object R1004. In FIG. 3, one foreground object and one unnecessary object are indicated by reference signs R1003 and R1004, respectively.

An image CA shows an example of an input image that has been converted (segmented) into a foreground region (object) R2001 and a background region R2002 by the object segmentation unit 11. One of the foreground objects is indicated by reference symbol R2001. The image CA that has been segmented (separated) by the object segmentation unit 11 is stored in the storage unit 90.

Figure 4:
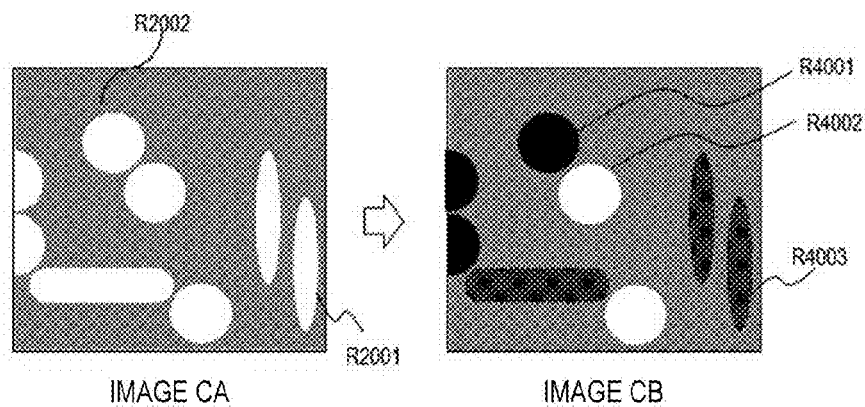
FIG. 4 schematically illustrates an example of processing to be executed by an object classification unit.

FIG. 4 schematically illustrates an example of processing to be executed by the object classification unit 15. In FIG. 4, the image CA is an example of an image that has been separated (segmented) into the background region R2002 and the foreground object R2001 by the object segmentation unit 11. An image CB is an example of an input image after object classification.

In the classified image, reference signs R4001, R4002, and R4003 respectively indicate objects of different classes classified by the object classification unit 15. In FIG. 4, the objects of different classes are respectively indicated by reference signs R4001, R4002, and R4003. The image CB classified by the object classification unit 15 is stored in the storage unit 90.

Figure 5:
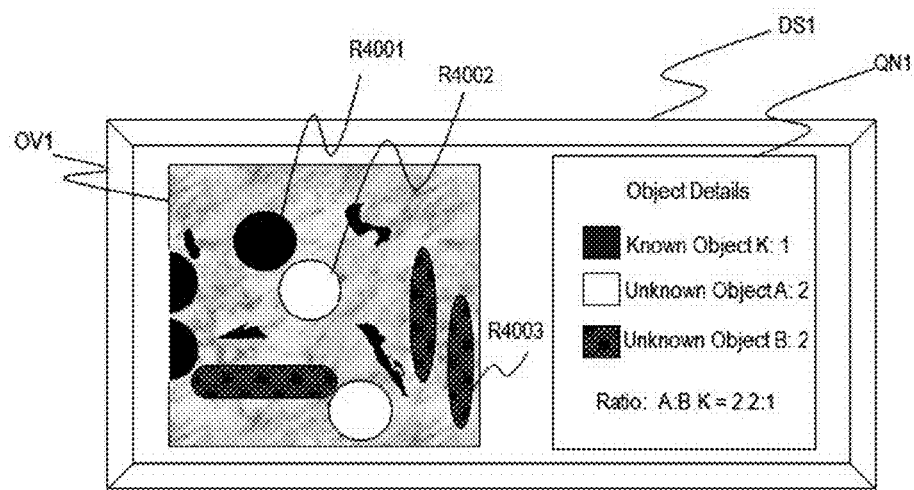
FIG. 5 schematically illustrates an example of a processing result of a display unit.

FIG. 5 schematically illustrates an example of a processing result of the display unit 17. The display unit 17 receives information and output image from the object classification unit 15, and presents the information and output image to the user in a predetermined image format DS1. For example, a pattern indicating a class is superimposed on an actual object image OV1, and is presented together with quantitative information QN1 such as a number and a ratio.

[Object Segmentation Unit 11]

The input image received by the input unit 10 may include unnecessary objects or a general image background together with objects of interest. The object segmentation unit 11 converts the input image into necessary background and foreground regions. The object segmentation unit 11 receives the image C, which is the output from the input unit 10, and executes processing to generate the segmented image CA. For example, a general segmentation method can be performed by using a convolutional neural network.

As an example of the object segmentation unit 11, the convolutional neural network can be used to execute conventional convolutional processing or widely known fully-convolutional operation and generate segmentation images having the foreground region R2001 and the background region R2002 as illustrated in the image CA. However, any technique can be used to generate similar segmentation images.

[Learning Unit 12]

The learning unit 12 is activated in a case where the user needs to learn about new data (training data). The new data may include both unknown and known types of objects.

A task of the learning unit 12 is to generate new models for the object segmentation unit 11 by finding new unknown objects of interest in given data. In order to realize this task, the learning unit 12 receives the input images together with labels of the known class from the input unit 10.

In an example of the learning unit 12, the convolutional neural network can used to execute the conventional convolution processing or widely known fully convolutional processing and generate a separation image having the foreground region R2001 and the background region R2002 as illustrated in the image CA.

However, the conventional convolutional neural network processing is insufficient for the purpose of finding all unknown object regions of interest. One possible solution is that the learning unit 12 performs iteration on the input data many times using known class information, and gradually finds regions of all unknown objects of interest. Note that any method for finding regions of all unknown objects of interest can be used.

The learning unit 12 also generates candidate regions of unknown objects of interest in each iteration. The candidate regions gradually increase as the learning unit 12 repeats a plurality of iterations for given data. The learning unit 12 detects the similarity of the pattern in another unknown objects using the information about known objects.

In each iteration, the amount of patterns of known objects increases cumulatively as more unknown objects of interest are learned and detected. The candidate regions may be accumulated in each iteration cycle and used as a new learning label in the next iteration. However, not all the newly generated candidate regions are actual regions of interest, and may include unnecessary objects. In order to remove this, the threshold processing unit 13 described below can be used.

[Threshold Processing Unit 13]

The threshold processing unit 13 can be activated when the learning unit 12 is activated, and is activated, for example, when the user needs to learn about new data. The new data may include objects of both known and unknown types. When the new data is to be processed by the object segmentation unit 11, it is not always possible to correctly discard unnecessary objects. Therefore, the threshold processing unit 13 is used so that erroneous learning in the learning unit 12 is not performed when unnecessary objects becomes objects of interest.

In order to learn that the learning unit 12 correctly detects regions of new unknown objects of interest, it is important that the learning unit 12 can correctly distinguish the unknown objects of interest from unnecessary objects in image data. However, during the repetitive training in the learning unit 12, since no teacher (label) available for the unknown objects is present, unnecessary objects might be detected. In order to prevent this, a threshold processing method is used, and the unnecessary objects is discarded in the learning unit 12.

Figure 6:
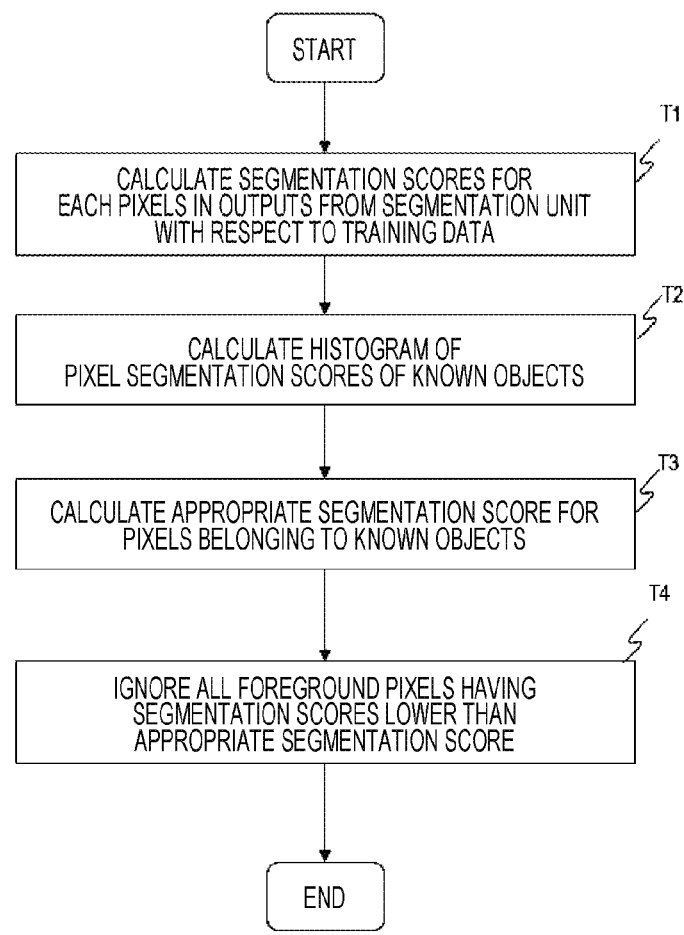
FIG. 6 is a flowchart illustrating an example of a method to be performed by a threshold processing unit according to the first embodiment.

FIG. 6 is a flowchart illustrating an example of a method to be performed by the threshold processing unit 13 according to the first embodiment.

Step T1

The object segmentation unit 11 calculates a segmentation scores for each pixels in the images. The pixels are classified into foreground or background based on the segmentation scores. In step T1, the threshold processing unit 13 receives the output from the object segmentation unit 11 and determines a segmentation scores for each pixels of known objects.

Step T2

The threshold processing unit 13 calculates a histogram of the segmentation scores for all the pixels of the known objects.

Step T3

The threshold processing unit 13 determines appropriate segmentation scores as the pixels of the known objects based on the generated histogram.

Step T4

Since unnecessary objects and objects of interest share some, but not all, characteristics of known classes, the unnecessary objects can sometimes be detected as objects of interest. Therefore, the segmentation score values of unnecessary pixels detected as foreground are smaller than the appropriate values of the foreground pixels of the true objects of interest. Use of this information enables pixels whose segmentation score values are smaller than appropriate values of the foreground pixels of the true objects of interest to be ignored during training of the segmentation model in the learning unit 12.

Figure 7:
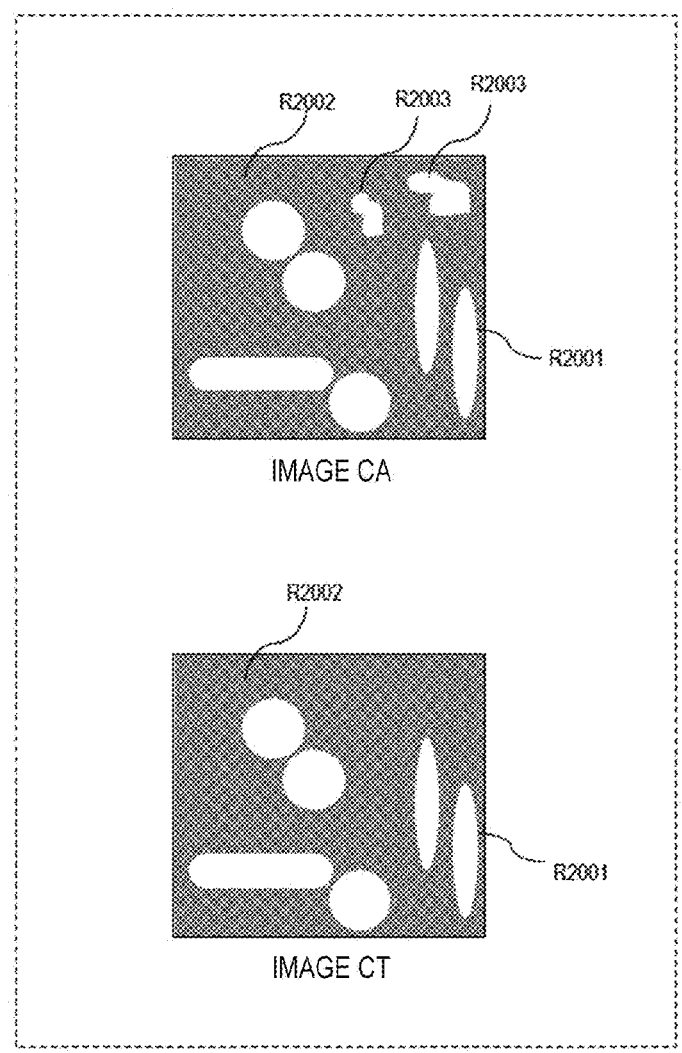
FIG. 7 illustrates an example of processing to be executed by the threshold processing unit.

FIG. 7 illustrates an example of the processing to be executed by the threshold processing unit 13. In FIG. 7, the image CA shows an example of an output from the object segmentation unit 11, and includes the background region R2002, the plurality of foreground objects R2001, and a plurality of other unnecessary objects R2003. An image CT shows an example of an output from the threshold processing unit 13, and the unnecessary objects (regions) R2003 are deleted. The image CT can be used as an accurate label for training the model in the learning unit 12. Both the image CA and the image CT are stored in the storage unit 90.

[Stop Point Determination Unit 14]

The stop point determination unit 14 can be activated when the learning unit 12 is activated. For example, the stop point determination unit is activated when the user needs to learn about new data in the apparatus. The stop point determination unit 14 determines the appropriate number of iteration steps necessary for the learning unit 12 to appropriately learn all new unknown objects of interest in the data.

In order that the learning unit 12 correctly learns new unknown object regions of interest, it is important that the learning unit 12 iteratively learns the training data received from the input unit 10 and accumulatively learns and discovers new unknown objects of interest. However, it is important to determine an appropriate number of iterations so that a stopping point can be determined. The stop point determination unit 14 is used to determine an appropriate stop point. The stop point determination unit 14 can determine the stop point of the learning unit 12 using detection accuracy information about the background region and detection accuracy information about the foreground (objects of interest) region. The detection accuracy of the background or the foreground can be expressed by, for example, a ratio of determining known background pixels or known foreground pixels as the background or the foreground.

Figure 8:
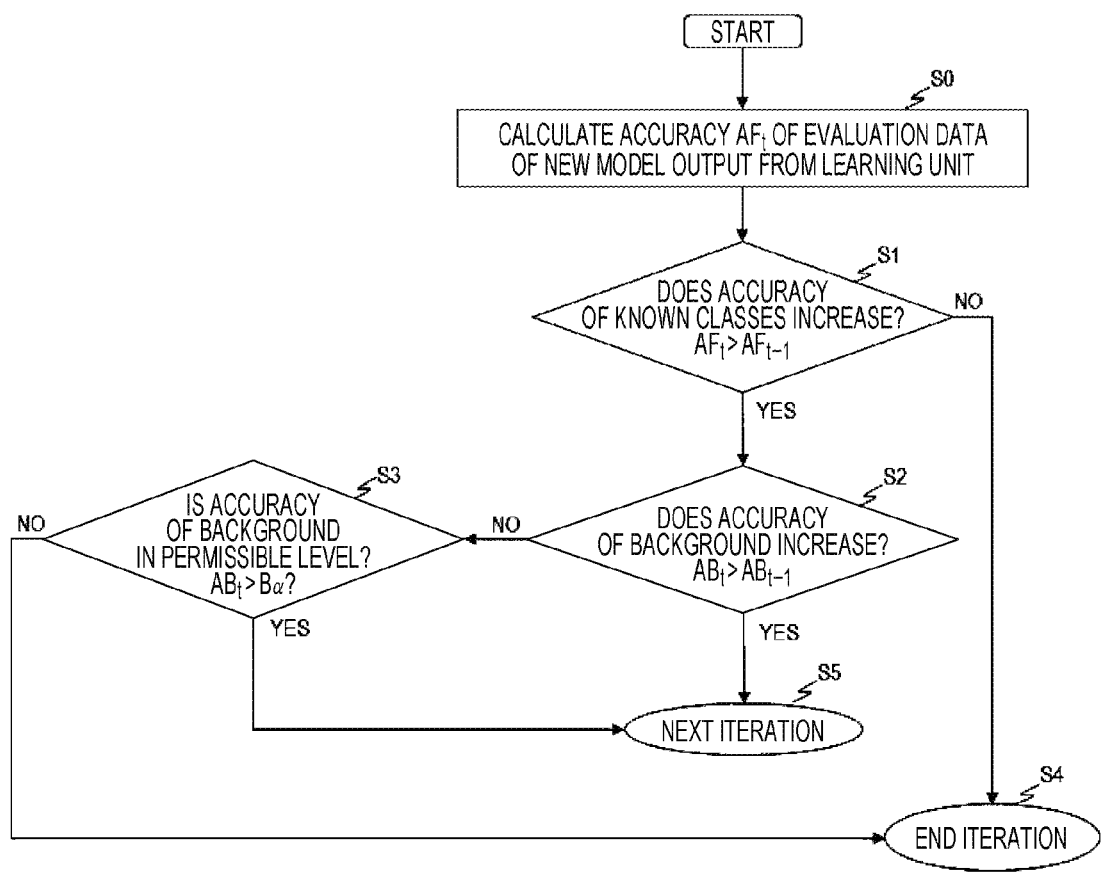
FIG. 8 illustrates an example of a method to be performed by a stop point determination unit according to the first embodiment.

FIG. 8 illustrates an example of a method to be performed by the stop point determination unit 14 according to the first embodiment. The accuracy mentioned in the following steps may be accuracy output from one model or a moving average value of the accuracy output from a plurality of models.

Step S0

The stop point determination unit 14 calculates accuracy with respect to evaluation data from the learning unit 12. The evaluation data may include known objects of foreground regions, a known background region, and unknown regions.

Step S1

In a case where estimation accuracy $AF_t$ of a new model for the foreground region of the known objects in the evaluation data increases and $AF_t > AF_{t-1}$, the stop point determination unit 14 proceeds to step S2, and otherwise, proceeds to step S4.

Step S2

In a case where accuracy of the new model for a known background region $AB_t$ in the evaluation data increases and $AB_t > AB_{t-1}$, the stop point determination unit 14 proceeds to step S5, and otherwise, proceeds to step S3.

Step S3

In a case where the accuracy of the new model with respect to the background region for the known background region in the evaluation data is reduced and $AB_t < AB_{t-1}$, the stop point determination unit 14 checks whether the accuracy for the background is within a permissible level $B_a$. When $AB_t > B_a$ is satisfied (when $AB_t$ is within the permissible level), the stop point determination unit 14 proceeds to step S5, and otherwise, proceeds to step S4. As a result, the detection accuracy of the foreground region can be improved, and a desired level of background detection accuracy can be obtained. The permissible level is preset by the user, for example.

Step S4

The iteration is ended.

Step S5

The next iteration is performed.

Figure 9A:
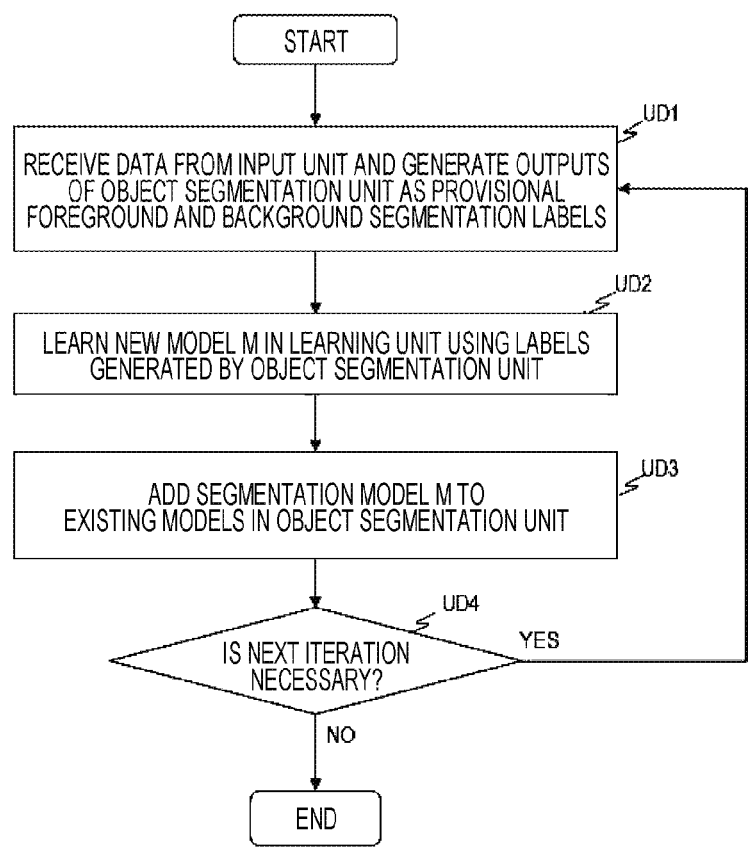
FIG. 9A illustrates basic cooperation of an input unit, the object segmentation unit, and a learning unit.
Figure 9B:
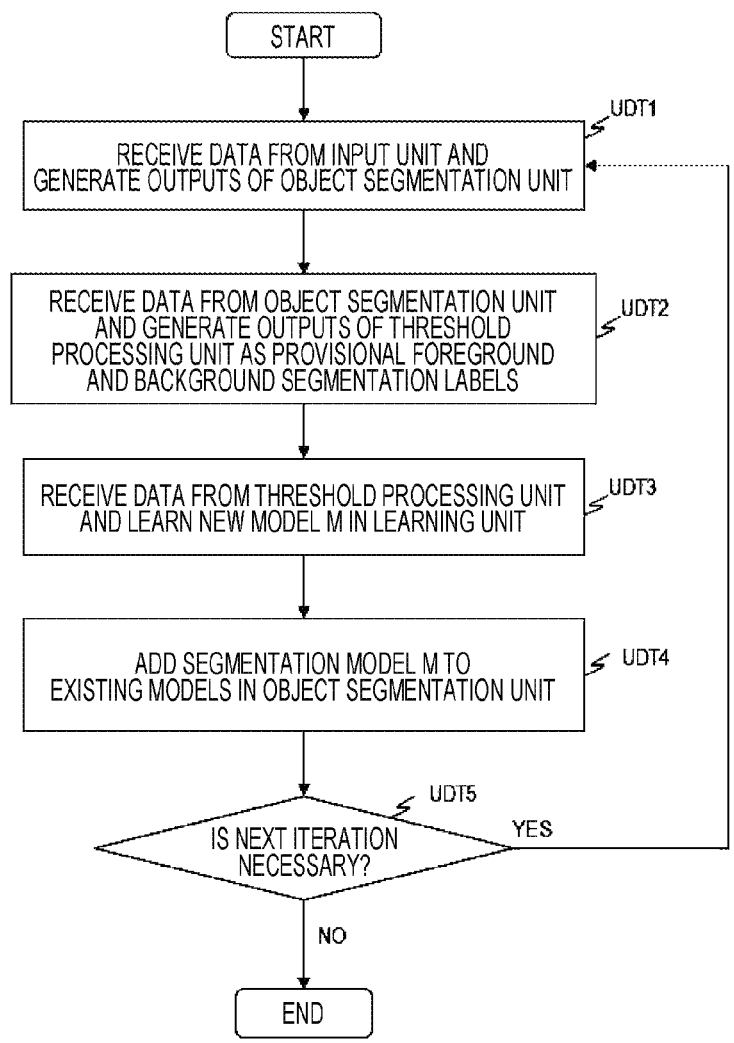
FIG. 9B illustrates processing for discarding a waste region that is unnecessary by the threshold processing unit together with the flow of FIG. 9A.
Figure 9C:
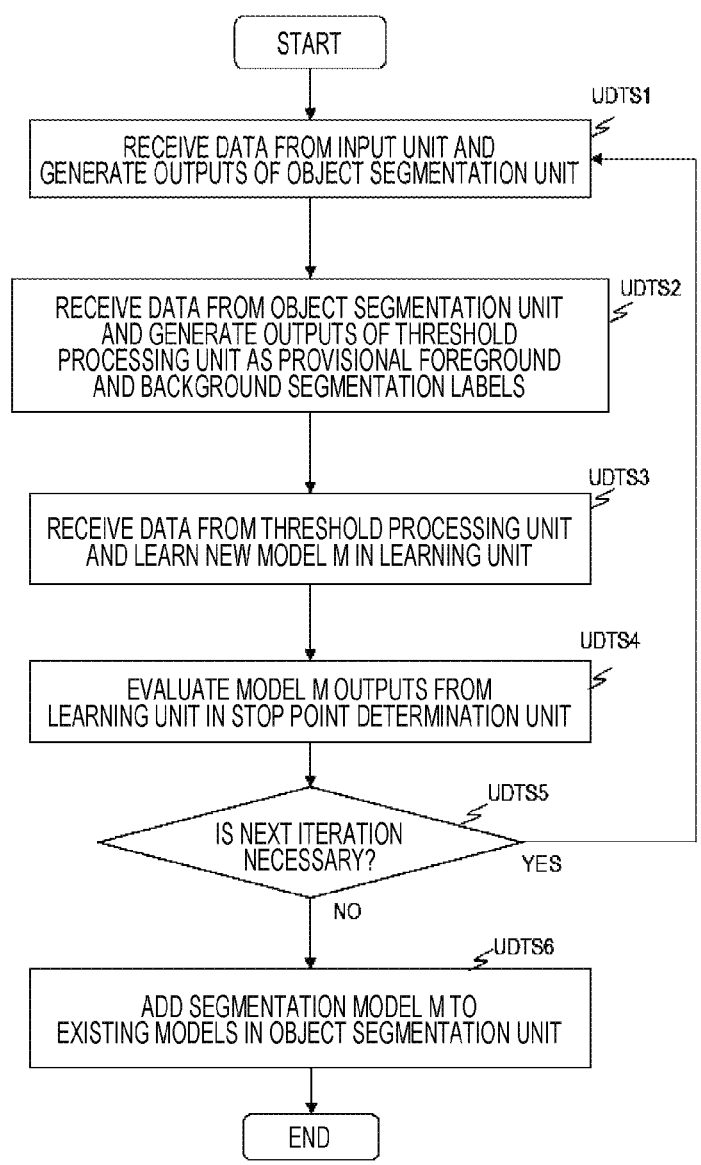
FIG. 9C illustrates processing in which the stop point determination unit automatically determines an appropriate number of iteration steps together with the flow of FIG. 9B.

FIGS. 9A to 9C illustrate three examples of processing flows in which the different functional units cooperate to iteratively detect regions of unknown and known objects. The quantitative analysis apparatus 1 can perform these flows individually, and can omit functional units unnecessary for execution of each flow. FIG. 9A illustrates the basic cooperation of the input unit 10, the object segmentation unit 11, and the learning unit 12. FIG. 9B illustrates an example in which processing for discarding an unnecessary waste region to be executed by the threshold processing unit 13 is added to FIG. 9A.

FIG. 9C illustrates an example in which processing for automatically determining an appropriate number of the iteration steps to be executed by the stop point determination unit 14 is added to FIG. 9B. In all the flows, the purpose is to use only the information about the known objects as segmentation labels at the start and add labels newly generated by learning to the existing segmentation labels, and enable the newly generated labels to be used for training the model in the next iterative step.

An example of a cooperative operation of the input unit 10, the object segmentation unit 11, and the learning unit 12 in a case where learning of new unknown objects is necessary in the first embodiment will be described with reference to FIG. 9A. This is one of the basic configurations according to one embodiment described in this specification.

Step UD1

The object segmentation unit 11 receives the new data from the input unit 10 and outputs segmentation results as a provisional foreground and background segmentation labels. The provisional labels are based on the outputs from a past models and may vary depending on the foreground region of interest newly found by models to be generated in a subsequent iteration.

Step UD2

The learning unit 12 trains a new segmentation model M using the above-described segmentation label.

Step UD3

The object segmentation unit 11 receives the new model M from the learning unit 12 and adds the model M to the existing models. In this manner, the models held by the object segmentation unit 11 are accumulated with iterations, and the number of models that can be used in the segmentation in step UD1 can be increased.

Step UD4

Based on the user request or the predetermined total required number of iteration steps, if further iterations are required, the flow returns to step UD1.

An example of a cooperative operation of the input unit 10, the object segmentation unit 11, the learning unit 12, and the threshold processing unit 13 in a case where learning of new unknown objects is necessary according to the first embodiment will be described with reference to FIG. 9B. This configuration further includes processing of the threshold processing unit 13 in addition to the basic configuration illustrated in FIG. 9A.

Step UDT1

The object segmentation unit 11 receives new data from the input unit 10 and outputs segmentation results based on outputs from one or more existing models (for example, all existing models).

Step UDT2

The threshold processing unit 13 receives the outputs from the object segmentation unit 11, and executes the threshold processing on the pixel of the segmentation label as described above in accordance with a preset policy of the threshold processing unit 13. The threshold processing unit 13 generates provisional foreground and background segmentation labels. The provisional labels are based on the outputs from the existing model of the object segmentation unit 11 and may change based on newly found foreground regions of interest in a next model in a subsequent iteration.

Step UDT3

The learning unit 12 receives the output from the threshold processing unit 13 and trains the new segmentation model M using the segmentation label.

Step UDT4

The object segmentation unit 11 adds the new model M obtained from the learning unit 12 to the existing model. In such a manner, the models of the object segmentation unit 11 are accumulated. In step UDT1, the object segmentation unit 11 outputs segmentation results using the accumulated models.

Step UDT5

In a case where further iteration is required, the flow returns to step UDT1, but in a case of No, it ends.

An example of a cooperative operation of the object segmentation unit 11, the learning unit 12, the threshold processing unit 13, and the stop point determination unit 14 in a case where learning of new unknown objects are necessary in the first embodiment will be described with reference to FIG. 9C. This configuration further includes processing of the stop point determination unit 14 in addition to the basic configuration illustrated in FIG. 9B.

Step UDTS1

The object segmentation unit 11 receives new data from the input unit 10 and outputs segmentation results based on outputs from one or more existing models (for example, all existing models).

Step UDTS2

The threshold processing unit 13 receives the outputs from the object segmentation unit 11, and executes the threshold processing on the pixel of the segmentation labels as described above in accordance with a preset policy of the threshold processing unit 13. The threshold processing unit 13 generates provisional foreground and background segmentation labels. The provisional labels is based on the outputs from the existing model of the object segmentation unit 11 and may change based on newly found foreground regions of interest in a next model in a subsequent iteration.

Step UDTS3

The learning unit 12 receives the outputs from the threshold processing unit 13 and trains a new segmentation model M using the known segmentation labels.

Step UDTS4

The stop point determination unit 14 evaluates the new model M.

Step UDTS5

As described with reference to FIG. 8, the stop point determination unit 14 determines whether execution of a next iteration is necessary. In a case where the next repetition is necessary in the outputs from the stop point determination unit 14, the flow proceeds to step UDTS1. In a case of No, the flow proceeds to step UDTS6.

Step UDTS6

The object segmentation unit 11 adds the new model M obtained from the learning unit 12 to the existing model.

[Object Classification Unit 15]

The object classification unit 15 includes a classifier (for example, a convolutional neural network that classifies object types using convolutional output values), and classifies separated foreground regions into known object classes or an unknown object groups.

For example, when the convolutional neural network is used as the classifier, feature amounts calculated by a classification model that has been trained to perform classification into the known object classes in advance is used. The classification model is supposed to include a feature amount extraction unit and an identification unit. As an example, the classification model, includes a plurality of layers of the convolutional neural network. A final layer is the identification unit, and the other layers are the feature amount extraction unit.

At the time of training, the feature amount extraction unit and the identification unit are trained so that the outputs from the identification unit performs the classification into the known object classes. The outputs from the identification unit represents the type (class) of the known object, but cannot perform classification into the unknown object groups. Therefore, the classification into the known object classes and the unknown object groups are performed by clustering using the outputs from the feature amount extraction unit.

An example of a clustering method is a method with which vectors of feature amounts obtained by inputting images of two objects to the feature amount extracting unit are compared with each other, and when similarity such as cosine similarity is greater than or equal to a certain level, a determination is made that the objects belong to the same class. This threshold may be determined in advance by the user, or may be automatically calculated by the apparatus based on the similarity between the known object classes.

The above is an example, and a Euclidean distance, a Manhattan distance, or the like may be used as an index of the similarity of the feature amount vectors, or unsupervised learning such as a self-organization map, an expectation-maximization (EM) algorithm, or the like may be used as the clustering method. In addition, as the feature amount used for the clustering, a machine learning method other than the convolutional neural network may be used, or a hand-crafted feature amount such as Histograms of Oriented Gradients (HOG) or Scale-Invariant Feature Transform (SIFT) may be used. Further, a result of performing the machine learning for the classifier may be used by using a result of clustering as described above as a teacher.

Figure 10:
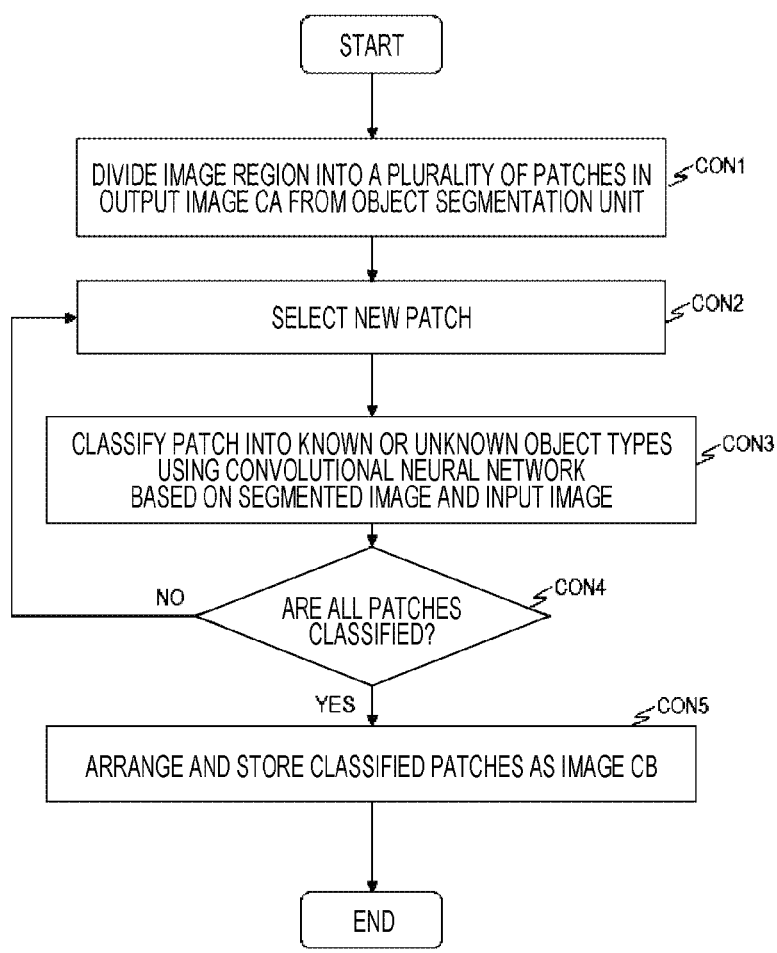
FIG. 10 illustrates a flowchart example of a technique that can be used as the object classification unit according to the first embodiment.

FIG. 10 illustrates a flowchart example of a technique that can be used as the object classification unit 15 relates to the first embodiment. The object segmentation unit 11 receives the input data from the input unit 10, and outputs the image CA that has been subject to the segmentation processing using one or more held models, for example, all models to the object classification unit 15.

Step CON1

The foreground region of the image CA is divided into a plurality of patches that can be input to the classifier of the object classification unit 15. The patch size depends on the memory capacity of the apparatus.

Step CON2

The object classification unit 15 selects one new patch from the plurality of patches generated in step CON1.

Step CON3

The object classification unit 15 inputs the patch selected in step CON2 to the classifier, and the classifier classifies the foreground region of the original image from the input unit 10 into the known object types or the unknown object types based on the foreground region from the objects segmentation unit 11. The unknown objects may be classified as each object type based on a classifier output value (for example, convolutional output value) from the convolutional neural network.

Step CON4

The object classification unit 15 checks whether all the patches have been classified, and when Yes, proceeds to step CON5, and when No, returns to step CON2.

Step CON5

The object classification unit 15 arranges the classified patches and stores the patches in the storage 206 as the image CB.

[Quantitative Arithmetic Unit 16]

The quantitative arithmetic unit 16 calculates quantitative information about the classified foreground object R2001 in the image CB. The quantitative information can also be used as special information for another task, for example, as described in the second and third embodiments.

Figure 11:
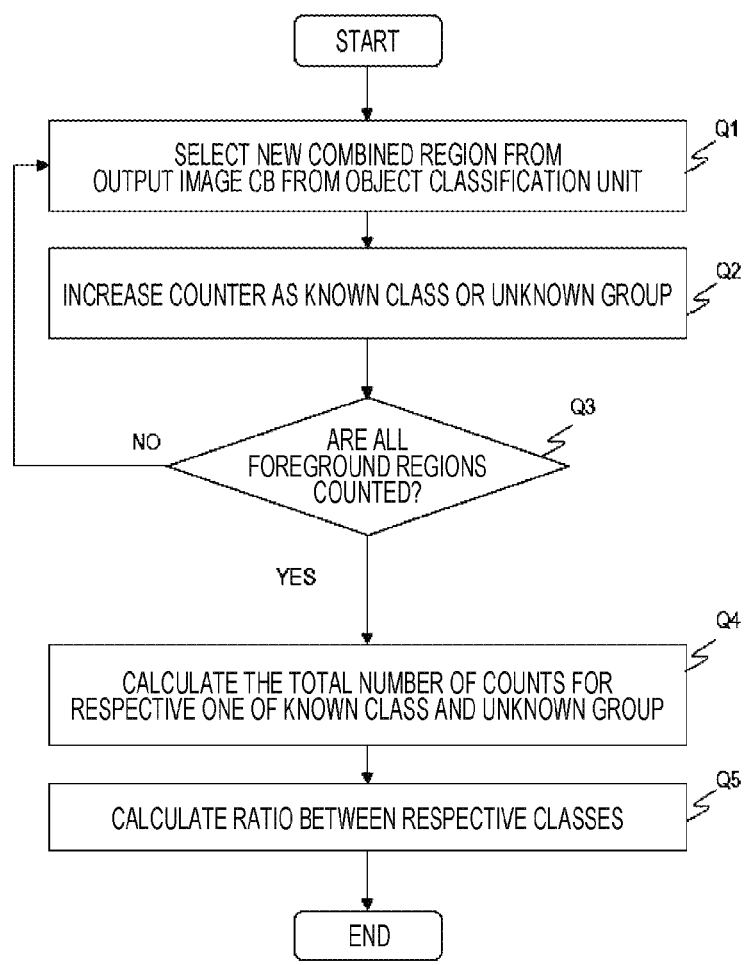
FIG. 11 illustrates a flowchart of an operation of a quantitative analysis processing example by a quantitative arithmetic unit.

FIG. 11 illustrates a flowchart of an operation of an example of the quantitative processing executed by the quantitative arithmetic unit 16. In this example, the quantitative information to be calculated is the total number of objects obtained by counting detected objects and the ratio of the objects of interest in the input image CB.

Step Q1

The quantitative arithmetic unit 16 receives the image CB that is the output from the object classification unit 15 and selects a part of the combined foreground region.

Step Q2

The quantitative arithmetic unit 16 determines the class of the region based on the image CB that is the classification result of the object classification unit 15, and increments the counter of the specific known class or unknown group.

Step Q3

The quantitative arithmetic unit 16 determines whether all the foreground regions in the image CB have been counted. When Yes, the processing proceeds to step Q4, and when No, the processing returns to step Q1.

Step Q4

The quantitative arithmetic unit 16 compiles the total number of counts for each class.

Step Q5

The quantitative arithmetic unit 16 calculates a ratio of each class.

The quantitative information in steps Q4 and Q5 is output and stored in the storage 206. The quantitative information may also be displayed by using the display device in the output device 203. The quantitative information in the above example is/are the number of objects or/and their ratios. This information can be used to analyze samples in a variety of methods.

[Display Unit 17]

The display unit 17 presents the outputs from the quantitative arithmetic unit 16 to the user. The information to be presented includes, for example, a ratio between known objects and unknown object groups. The outputs from the display unit 17 can be displayed with the outputs being superimposed on the input images, and the information displayed in the superposed manner indicates, for example, objects belonging to the known classes and the unknown groups.

Figure 12:
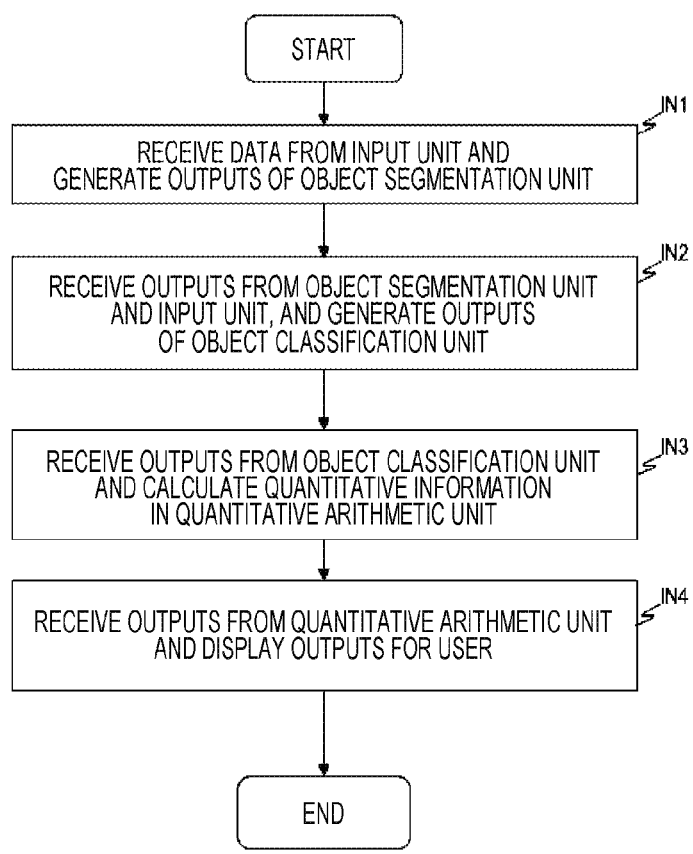
FIG. 12 illustrates an example in which the quantitative analysis apparatus according to the first embodiment presents quantitative information to a user through a cooperative operation of the object segmentation unit, the object classification unit, the quantitative arithmetic unit, and the display unit.

FIG. 12 illustrates an example of a cooperative operation of the object segmentation unit 11, the object classification unit 15, the quantitative arithmetic unit 16, and the display unit 17 according to the first embodiment in a case where the quantitative analysis apparatus 1 according to the first embodiment needs to present quantitative information to the user, for example, in an estimation phase.

Step IN1

The object segmentation unit 11 receives new data from the input unit 10 and outputs a segmentation result based on outputs from one or more existing models (for example, all existing models).

Step IN2

The object classification unit 15 receives the outputs from the object segmentation unit 11 and classifies objects of interest into one or more known object types and one or more unknown object groups.

Step IN3

The quantitative arithmetic unit 16 receives the outputs from the object classification unit 15, and generates necessary quantitative information.

Step IN4

The display unit 17 receives the quantitative information from the quantitative arithmetic unit 16 and displays the quantitative information for the user.

As described above, according to the embodiment in this specification, the input images from the input unit 10 is converted to images indicating the foreground object regions of interest and the background region.

Furthermore, the foreground regions are classified by using the object classification unit 15, and the accurate class category of each known objects and one or more unknown object groups can be determined with high accuracy.

The quantitative information from the classified images is, for example, the number of objects, and the object ratio, and is obtained from the quantitative arithmetic unit 16. Further, results of the quantitative information and qualitative information can be presented to the user by the display unit 17 along with the input images. The user can use the presented information to study the features of the detected objects and their co-occurrence pattern, and can determine phenomena for the detected objects from these results.

A summary of the above-described first embodiment in this specification will be described below. The quantitative analysis apparatus 1 includes the input unit 10 and the object segmentation unit 11. The input unit 10 receives images from the imaging apparatus, for example, and outputs the image to the object segmentation unit 11. The object segmentation unit 11 can efficiently and accurately indicate a necessary background region and foreground regions including objects of interest using the input images.

The quantitative analysis apparatus 1 further includes the learning unit 12 that can be used to learn a new unknown object groups from data. The output from the learning unit 12 is a new segmentation model and can be used in the object segmentation unit 11. The learning unit 12 can detect unknown object regions using the data iteratively and cumulatively. The object segmentation unit 11 can detect new unknown objects using the model from the learning unit 12.

The quantitative analysis apparatus 1 further includes the threshold processing unit 13. The threshold processing unit 13 can prevent the learning unit 12 from detecting an unnecessary objects as objects in regions of interest. The use of the threshold processing unit 13 can help the learning unit 12 generate an accurate model, and the object segmentation unit 11 can separate (segment) the known objects, the unknown object groups, and the background region accurately using the model.

The quantitative analysis apparatus 1 further includes a stop point determination unit 14, and the unit can determine an optimum number of iterations in the learning unit 12. The learning unit 12 learns new unknown objects with an iterative method. Therefore, it is important for the optimum operation of the learning unit 12 to determine the optimum number of iterations. The stop point determination unit 14 uses the data of the learning unit 12 to determine a stop point of iterations in the learning unit 12 based on a predetermined quality policy.

The quantitative analysis apparatus 1 further includes the object classification unit 15 that can efficiently and accurately classify objects into known class categories and the unknown object groups. As an example, a typical convolutional neural network can be optimized for this task. The convolutional neural network that is an image feature extraction model does not have to be manually trained, can automatically learn the feature amount from an image, and can group unknown objects based on a predetermined classification score.

The quantitative analysis apparatus 1 further includes the quantitative arithmetic unit 16 that can efficiently and accurately calculate quantitative information about foreground objects. As an example, as described above, the number of objects for each class is calculated, and the object ratio is further calculated.

The quantitative analysis apparatus 1 further includes the display unit 17 that can present the output from the quantitative arithmetic unit 16 to the user. The information to be presented includes, for example, the ratio between known objects and unknown object groups. The outputs from the display unit 17 can be superimposed on an input images, and the information can indicate, for example, objects belonging to the known class and the unknown group.

According to the configuration of the embodiment, the known and unknown objects of interest can be accurately identified in images, and quantitative information about these objects can be accurately determined. Note that, for example, the input unit 10, the object segmentation unit 11, the learning unit 12, the threshold processing unit 13, and the stop point determination unit 14 can be mounted on an apparatus or a system different from the quantitative analysis apparatus 1, and the threshold processing unit 13, and the stop point determination unit 14 may be omitted in accordance with the design of the apparatus or the system.

Second Embodiment

In some cases, it is necessary to detect abnormal objects in given images and to clearly present the abnormal objects to a user. This situation may occur, for example, in a case where most objects in the images are estimated to be known objects. Therefore, an abnormality detection system according to a second embodiment will be described below.

An abnormality detection system A1 determines objects of interest in the unknown group classified by the object classification unit 15 as abnormal objects. The abnormality detection system A1 can present information about the detected abnormal objects to the user by superimposing highlight display on the input images via the display unit 17.

Figure 13:
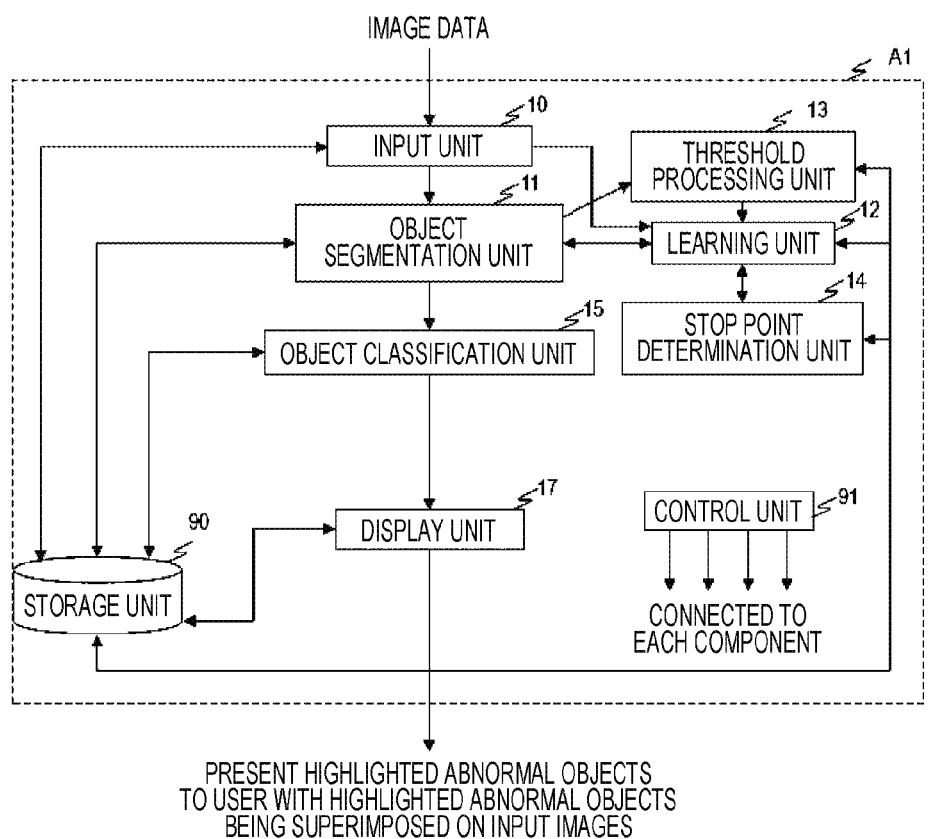
FIG. 13 schematically illustrates a functional configuration example of an abnormality detection system according to a second embodiment.

FIG. 13 schematically illustrates a functional configuration example of the abnormality detection system A1 according to the second embodiment. The abnormality detection system A1 has a configuration in which the quantitative arithmetic unit 16 is removed from the components of the quantitative analysis apparatus 1 illustrated in FIG. 1. In addition, in the abnormality detection system A1, the display unit 17 can present the information about the detected abnormal objects to the user by superimposing the highlighted display region on the input images.

Figure 14:
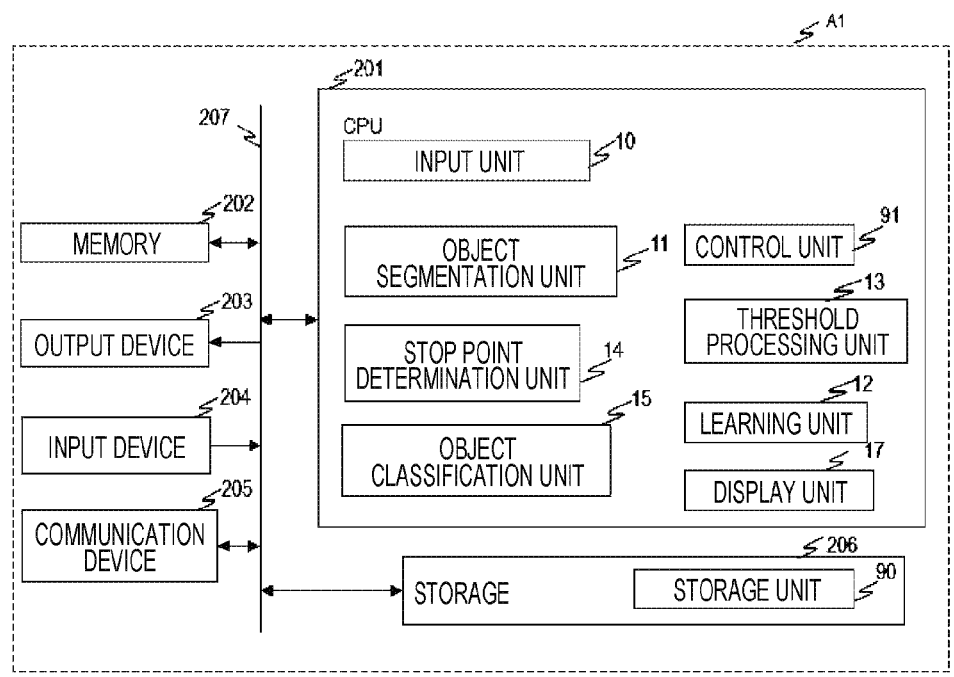
FIG. 14 schematically illustrates a hardware configuration example of the abnormality detection system according to the second embodiment.

FIG. 14 schematically illustrates a hardware configuration example of the abnormality detection system A1 according to the second embodiment. As illustrated in FIG. 14, the abnormality detection system A1 has a hardware configuration similar to that of the quantitative analysis apparatus 1. In the second embodiment, a central processing unit (CPU) 201 does not function as the quantitative arithmetic unit 16.

Third Embodiment

Figure 15:
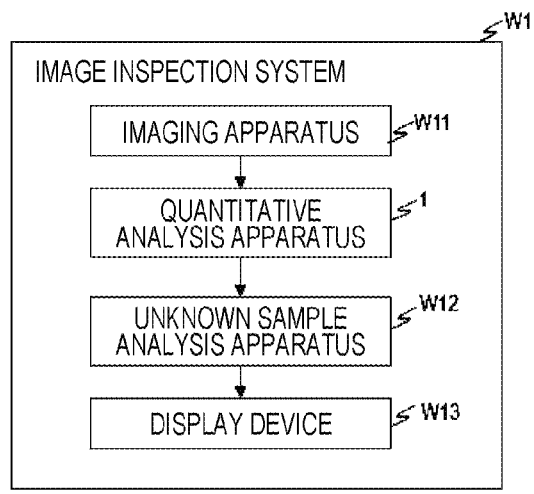
FIG. 15 schematically illustrates a configuration example of an image inspection system including a quantitative analysis system according to a third embodiment.

FIG. 15 schematically illustrates a configuration example of an image inspection system W1 including the quantitative analysis apparatus 1 according to a third embodiment. The quantitative analysis apparatus 1 might need to provide quantitative information in the image inspection system W1 and provide quantitative information in a series of images captured in different time frames.

The image inspection system W1 may include an imaging apparatus W11, and an imaging apparatus W11 can capture a series of image frame data of objects, for example, in a motion JPEG, MPEG, H.264, or HD-SDI format. For example, a red-green-blue (RGB) camera or any type of a camera or an imaging apparatus can be used.

The image inspection system W1 can include the quantitative analysis apparatus 1 according to the first embodiment, and the quantitative analysis apparatus 1 generates quantitative information about objects in the series of images. The image inspection system W1 can include an unknown sample analysis apparatus W12. The unknown sample analysis apparatus W12 can be used to analyze features of objects from quantitative information about unknown samples. The image inspection system W1 can include a display device W13. The display device W13 can present information about an analysis result of the unknown sample analysis apparatus W12 based on the quantitative information about the sample acquired from the quantitative analysis apparatus 1.

The image inspection system W1 can capture a series of images using the imaging apparatus W11, and can acquire quantitative information about input images of different time frames via the quantitative analysis apparatus 1. The unknown sample analysis apparatus W12 can present an analysis result of a change in the quantitative information about a sample in a predetermined time period.

The image inspection system W1 can acquire a series of image pairs simultaneously or separately. The image pairs are, for example, pairs of images captured at time t1 and images captured at time t2, or pairs of images of a sample to which some external intervention technique is applied and images of a sample to which the intervention technique is not applied. The image inspection system W1 calculates quantitative information about the input image pairs using the quantitative analysis apparatus 1. The unknown sample analysis apparatus W12 can analyze a change in the quantitative information with respect to, for example, the sample to which the external intervention technique is applied and the sample to which the external intervention technique is not applied.

The output of the analysis result from the unknown sample analysis apparatus W12 can be presented to the user by the display device W13. The user can study the output from the display device W13 to be able to know the influence of the intervention method on the sample during single time frame or a predetermined period. For example, for a certain material, in a case where found unknown objects include magnetic particles having different physical properties, the patterns or diameters thereof may clarify the behavior of the magnetic particles in a cluster in a normal state or in a case where the intervention method such as heat or pressure is applied.

Figure 16:
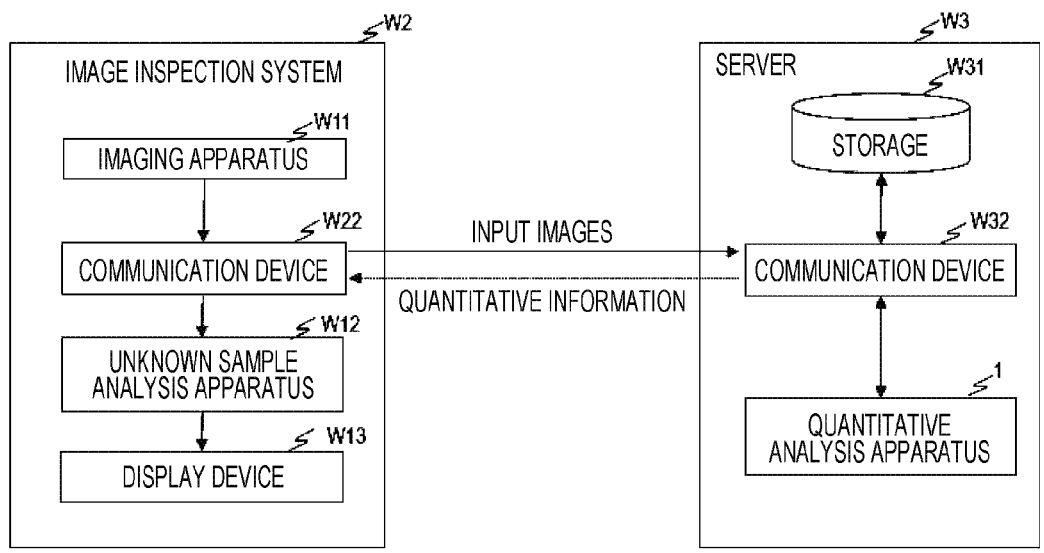
FIG. 16 illustrates another system configuration example according to the third embodiment.

FIG. 16 illustrates another example of the third embodiment, and the quantitative analysis apparatus 1 is mounted in a server W3. The server W3 acquires the input images from an imaging apparatus W11 of an image inspection system W2 using a communication device W32 of the server W3 via a communication device W22 of the image inspection system W2. The server W3 stores the acquired images in a storage W31. The communication device W32 transmits the images received from the storage W31 to the quantitative analysis apparatus 1 according to the first and third embodiments.

The quantitative analysis apparatus 1 in the server W3 calculates quantitative information about objects in images in accordance with the first and third embodiments, and transmits the quantitative information to the image inspection system W2 via the communication devices W32 and W22.

The information received by the communication device W22 of the image inspection system W2 is input to the unknown sample analysis apparatus W12. The unknown sample analysis apparatus W12 analyzes a property based on quantitative information about target objects. For example, in a case where the input images are images of magnetic particles, a quantitative analysis of the magnetic particle density may clarify the properties of the magnetic particles of a sample. The analysis result is input to the display device W13 to be presented to the user.

The display device W13 can present information about the objects in the images and the analysis result of the unknown sample analysis apparatus W12. The user can obtain various conclusions with reference to the displayed results. For example, the quality of the sample can be checked. The display device may be either an installation type device or a portable type device.

Note that the present invention is not limited to the above-described embodiments, and includes various modifications. For example, the above-described embodiments have been described in detail for easy understanding of the present invention, and are not necessarily limited to those having all the described configurations. Further, a part of the configuration of one embodiment can be replaced with the configurations of the other embodiments, and the configurations of the other embodiments can be added to the configuration of one embodiment. In addition, the other configurations can be added to and deleted from a part of the configuration of each embodiment, and a part of the configuration in each embodiment can be replaced with the other configurations.

Further, a part or all of the above-described configurations, functions, processing units, and the like may be realized by hardware, such as designing an integrated circuit. In addition, each of the above-described configurations, functions, and the like may be realized by software by an arithmetic device interpreting and executing a program for realizing each function. Information such as a program, a table, and a file for realizing each function can be stored in a recording device such as a memory, a hard disk, and a solid state drive (SSD), or a recording medium such as an integrated circuit (IC) card and an SD card.

In addition, the control lines and the information lines that are considered to be necessary for the description are indicate, and not all the control lines and the information lines of the product are necessarily indicated. In practice, it may be considered that almost all the configurations are connected to each other.

The invention claimed is:

1. An apparatus for generating segmentation models for identifying-objects of interest from images, the apparatus comprising:
an input unit that receives input images;
an object segmentation unit that receives the input images from the input unit, calculates segmentation scores for pixels using the segmentation models, and separates regions of-objects of interest from a background region based on the segmentation scores; and
a learning unit that learns the segmentation models to be used by the object segmentation unit;
a threshold processing unit; and
a stop point determination unit that determines whether to execute training of a next segmentation model in the learning unit,
wherein the learning unit
trains new segmentation models using training data and outputs of existing segmentation models in relation to the training data;
adds the new segmentation models that have been trained to the existing segmentation models, and
repeats the training of the new segmentation models and the adding of the new segmentation models that have been trained to the existing segmentation model,
wherein the threshold processing unit compares the segmentation scores of the pixels in unknown objects of interest detected by the existing segmentation models with a threshold to determine whether the unknown objects of interest are unnecessary objects, and outputs labels of the objects of interest,
wherein the stop point determination unit determines whether to execute training of the next model based on accuracy of estimating a segmentation model trained this time and accuracy of estimating a segmentation model trained last time.

2. A quantitative analysis apparatus that calculates quantitative information about objects of interest in images, the quantitative analysis apparatus comprising:
the apparatus according to claim 1;
an object classification unit that classifies the objects of interest separated by the object segmentation unit into known classes and unknown groups;
a quantitative arithmetic unit that calculates quantitative information about the known classes and the unknown groups; and
a display unit that presents the quantitative information calculated by the quantitative arithmetic unit to a user,
wherein the display unit displays results of superimposing the quantitative information calculated by the quantitative arithmetic unit and at least one of results of classifying the objects of interest into the known classes and or the unknown groups calculated by the object classification unit on the input images.

3. The quantitative analysis apparatus according to claim 2, wherein
the objects of interest are separated from input image data using the existing segmentation models,
the objects of interest that have been separated are classified into the known classes or the unknown groups, and
the objects in the unknown groups are set as abnormal objects and highlighted images in the input images are output.

4. A system comprising:
the quantitative analysis apparatus according to claim 2;
an imaging apparatus that acquires a series of images;
an unknown sample analysis apparatus that analyzes features of unknown samples from outputs from the quantitative analysis apparatus; and
a display device that displays analysis results output by the unknown sample analysis apparatus,
wherein the quantitative analysis apparatus, for the series of images,
separates the objects of interest from input image data using the existing segmentation models,
classifies the objects of interest that have been separated into known classes and unknown groups, and
calculates quantitative information about the known classes and the unknown groups, and
wherein the unknown sample analysis apparatus outputs analysis results of changes in the quantitative information in the series of images.

5. A system comprising:
the quantitative analysis apparatus according to claim 2;
an imaging apparatus that acquires a series of images of a first sample and a series of images of a second sample to which an external intervention method is applied;
an unknown sample analysis apparatus that analyzes features of unknown samples based on outputs from the quantitative analysis apparatus; and
a display device that displays analysis results output by the unknown sample analysis apparatus,
wherein the quantitative analysis apparatus, for the series of images of the first sample and the series of images of the second sample, separates the objects of interest from input image data using the existing segmentation models, classifies the objects of interest that have been separated into known classes and unknown groups, and calculates quantitative information about the known classes and the unknown groups, and wherein the unknown sample analysis apparatus outputs differences in the quantitative information between the series of images of the first sample and the series of images of the second sample as analysis results.

6. A method for generating segmentation models for identifying objects of interest from images, the method comprising:

receiving input images;

calculating segmentation scores for pixels using the segmentation models upon reception of the input images, and separating regions of objects of interest from a background region based on the segmentation scores; and learning the segmentation models used in the separating, wherein in the learning, new segmentation models are trained using training data and outputs of existing segmentation models in relation to the training data, the new segmentation models that have been trained are added to the existing segmentation models, and the training of the new segmentation models and the adding of the new segmentation models that have been trained to the existing segmentation models are repeated, the method further comprising comparing segmentation scores of pixels in unknown objects of interest detected by the existing segmentation models with a threshold to determine whether the unknown objects of interest, are unnecessary objects and outputting labels of the objects of interest, wherein in the learning, the new segmentation models are learned using the training data and the labels of the objects of interest calculated in the comparing, the method further comprising determining whether to execute training of a next segmentation model in the learning, wherein in the determining, a determination is made whether to train the next segmentation model, based on accuracy of estimating a segmentation model trained this time and accuracy of estimating a segmentation model trained last time.

7. A quantitative analysis method for calculating quantitative information about objects of interest in images, the quantitative analysis method comprising:

performing the method according to claim 6;

classifying the objects of interest separated in the separating into known classes and unknown groups;

calculating quantitative information about the known classes and the unknown groups; and presenting the quantitative information calculated in the calculating to a user, wherein in the presenting, results of superimposing the quantitative information calculated in the calculating and at least one of results of classifying the objects of interest into the known classes and the unknown groups calculated in the classifying on the input images are displayed.

\* \* \* \* \*